No. 636,805.  
F. S. HUNT.  
TEA KETTLE.  
(Application filed Mar. 2, 1899.)  
Patented Nov. 14, 1899.
(No Model.)
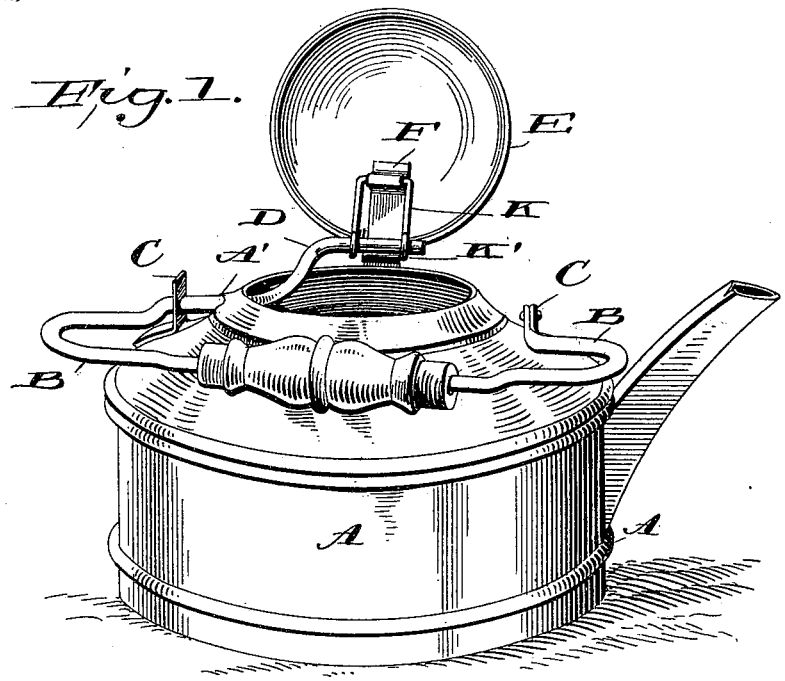
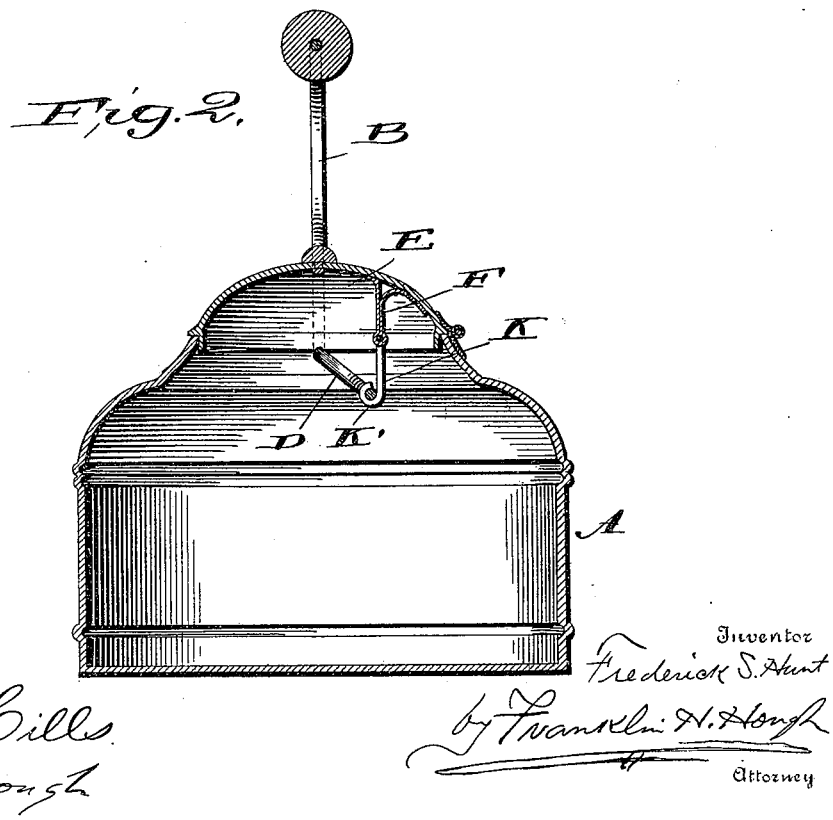
Witnesses  
L. C. Hills.  
A. L. Hough.
Inventor  
Frederick S. Hunt  
by Franklin H. Hough  
Attorney

UNITED STATES PATENT OFFICE.

FREDERICK S. HUNT, OF ALBANY, ILLINOIS.

TEA-KETTLE.

SPECIFICATION forming part of Letters Patent No. 636,805, dated November 14, 1899.

Application filed March 2, 1899. Serial No. 707,525. (No model.)

*To all whom it may concern:*

Be it known that I, FREDERICK S. HUNT, a citizen of the United States, residing at Albany, in the county of Whiteside and State of Illinois, have invented certain new and useful Improvements in Tea-Kettles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in tea-kettles, and especially to means whereby the cover of the kettle may be opened by manipulation of the handle.

More specifically the invention resides in the provision of a pivoted cover to the kettle, which has secured thereto a link or hook which is connected to an extended end of the handle to the kettle, which end is adapted to pass through the wall of the kettle and cause the cover to open and close as the handle is lowered and raised, said handle being held in a vertical position normally when the cover is closed.

To these ends and to such others as the invention may pertain the same consists in the novel construction, combination, and adaptation of parts, as will be hereinafter more fully described and then specifically defined in the appended claims.

My invention is clearly illustrated in the accompanying drawings, which, with the letters of reference marked thereon, form a part of this application, and in which—

Figure 1 is a perspective view of a kettle showing my improved cover-opener with the handle down and cover open, and Fig. 2 is a vertical section through the kettle.

Reference now being had to the details of the drawings by letter, A designates a tea-kettle of ordinary construction, and B is a handle, which is pivoted in the ears C. One end of said handle, as D, is extended through the wall of the kettle through the aperture A' and designed to engage with a hook or connection attached to the cover.

E represents the cover, which is hinged to the kettle adjacent to the opening therein, and riveted or otherwise secured to the under side of the cover is a strap F, in the looped end of which is carried the yoke K, with hooks K' at its ends, which hooks are designed to normally engage with the inner end of the handle, as shown clearly in Fig. 2 of the drawings. By this construction it will be noted that when the handle of the tea-kettle is raised to a vertical position the inner end of the bail or handle will cause the cover to be closed, and the weight of the cover when closed will hold the handle normally in a vertical position, as shown in Fig. 1. When it is desired to open the cover, the handle is merely thrown over on the side of the kettle, as shown in the drawings, and the cover is held open. By this construction it will be noted that the cover may be automatically opened and closed without danger of steam coming in contact with the hand of the operator.

While I have described my invention as applied to a tea-kettle, it will be understood that I do not confine myself to this limitation, but may apply it to any receptacle to which it may be adapted.

Having thus described my invention, what I desire to secure by Letters Patent is—

1. A device for opening and closing the cover of a tea-kettle, comprising the pivoted cover, a handle pivoted to the kettle and having one end extending into the interior of the kettle and connections between said inner end and the cover, whereby as the handle is swung from a horizontal to a vertical position and vice versa, the cover is respectively closed and opened, as set forth.

2. In combination with the kettle, the cover pivoted thereto, the handle pivoted to ears on the kettle, one end of said handle or bail having an end extended into the interior of the kettle, a strap secured to the under side of the cover, and a yoke pivoted to said strap and having its ends formed into hooks engaging with the inner end of said bail, whereby, as the bail is operated, the cover may be opened and closed, all as shown and described.

In testimony whereof I affix my signature in presence of two witnesses.

FREDERICK S. HUNT.

Witnesses:
CHESTER S. SLOCUM,
W. C. VANNEST.